United States Patent [19]

Boocock et al.

[11] 4,407,841

[45] Oct. 4, 1983

[54] RECOVERY OF A PROTEINACEOUS OAT FRACTION FROM A DISPERSION THEREOF IN HYDROCARBON SOLVENT

[75] Inventors: John R. B. Boocock, Kingston; Ronald E. Murray, Napanee, both of Canada

[73] Assignee: Du Pont Canada Inc., Mississauga, Canada

[21] Appl. No.: 315,921

[22] Filed: Oct. 28, 1981

[30] Foreign Application Priority Data

Nov. 6, 1980 [CA] Canada ................................ 364117

[51] Int. Cl.$^3$ .............................................. A23J 3/00
[52] U.S. Cl. .................................. 426/656; 260/123.5; 426/618
[58] Field of Search ............... 426/430, 618, 622, 656; 260/123.5

[56] References Cited

U.S. PATENT DOCUMENTS

| | | | |
|---|---|---|---|
| 2,278,670 | 4/1942 | Rauer | 260/123.5 |
| 3,519,431 | 7/1970 | Wayne | 426/430 X |
| 3,520,868 | 7/1970 | Henderson et al. | 260/123.5 |
| 3,941,764 | 3/1976 | Hensarling et al. | 426/656 |
| 3,998,800 | 12/1976 | Youngquist | 260/123.5 |
| 4,089,848 | 5/1978 | Bell et al. | 426/656 X |
| 4,208,259 | 6/1980 | Oughton | 426/656 X |
| 4,211,695 | 7/1980 | Oughton | 426/656 X |
| 4,211,801 | 7/1980 | Oughton | 426/430 |
| 4,376,133 | 3/1983 | Farnand | 426/656 |

FOREIGN PATENT DOCUMENTS

| | | | |
|---|---|---|---|
| 46-40746 | 12/1971 | Japan | 426/430 |
| 51-22078 | 7/1976 | Japan | 426/430 |

*Primary Examiner*—Kenneth M. Schor

[57] ABSTRACT

A process for the recovery of a proteinaceous oat fraction from a dispersion thereof in an aliphatic hydrocarbon solvent is disclosed. The dispersion is admixed with at least 2.5%, by weight, of a solution of ethyl alcohol and water, whereby the dispersion agglomerates. The amount of water in the resultant admixture of agglomerate and solvent is then reduced to less than 0.3%, by weight. The proteinaceous oat fraction that is recovered has a low bulk density, e.g., less than 0.14 g/ml, is white, soft and fluffy. The fraction may be used in a variety of food products.

10 Claims, No Drawings

RECOVERY OF A PROTEINACEOUS OAT FRACTION FROM A DISPERSION THEREOF IN HYDROCARBON SOLVENT

BACKGROUND OF THE INVENTION

The present invention relates to a process for the recovery of a proteinaceous oat fraction from a dispersion thereof in a hydrocarbon solvent and to the proteinaceious fraction of oats so obtained.

Oats are a potential source of a wide variety of useful products. Examples of such products are flour, starch, protein isolate and concentrate, protein-enriched flour, bran, gum and oil. Traditional techniques used in the cereal grain processing industry are frequently difficult to use with oats because of process problems relating to the presence of oil in the oats. Moreover, unless the oats are de-oiled prior to milling, such milling processes would result in the formation of flour and bran fractions containing oil which may result in the development of rancidity on storage of the flour and bran.

Gum, together with some protein and starch, may be removed in part by treatment of oats with water, the resultant dilute aqueous solution of gum then requiring treatment prior to disposal or for recovery of the gum. Protein may be extracted from comminuted oats with aqueous solutions, especially alkaline solutions. However, gum present in the oats may also be extracted into solution and the resultant solutions may be viscous and cause process problems, especially in the separation of solids from the aqueous solutions.

A process for the separation of a flour fraction, a bran fraction and oil from comminuted oats in which gum does not cause significant process problems and in which the flour is essentially free of gum is disclosed in U.S. Pat. No. 4,211,801 of R. W. Oughton, issued July 8, 1980. A process for the separation of comminuted oats, especially flour fractions, into fractions differing in composition in which the separation occurs under the influence of centrifugal force is disclosed in U.S. Pat. No. 4,211,695 of R. W. Oughton, issued July 8, 1980.

The separation of comminuted oats, or fractions thereof, from an admixture of such oats or fractions and a hydrocarbon solvent may be accomplished by, for example, centrifuging the admixture. However such techniques are capable of improvement, especially with regard to the separation of products so that the remaining hydrocarbon miscella has a low level of fines. The presence of fines in miscella, usually in the form of a dispersion of the fines in the miscella, has traditionally been a problem in the processing of oil seeds. Miscella containing fines may be obtained from other sources, e.g., de-oiling of oats, or fractions thereof.

A process for the separation of comminuted oats, especially fractions thereof, from an admixture of such oats or fractions and a hydrocarbon solvent, including admixtures in the form of dispersions, so that the remaining miscella has a low level of fines is described in U.S. Pat. No. 4,208,259 of R. W. Oughton, issued July 17, 1980.

SUMMARY OF THE INVENTION

It has now been found that proteinaceous oat fraction in the form of dispersions in hydrocarbon solvent may be separated from the solvent by admixing the dispersion with a solution of ethyl alcohol and water, reducing the level of water in the slurry and recovering the proteinaceous oat fraction. It has also been found that the proteinaceous fraction of the oats so obtained has a soft texture and a relatively low bulk density.

Accordingly the present invention provides a process for the recovery of a proteinaceous oat fraction from a dispersion thereof in an aliphatic hydrocarbon solvent, said hydrocarbon having 5–8 carbon atoms and said proteinaceous fraction containing at least 50%, by weight, of protein, the process comprising the steps of:

(a) admixing the dispersion with at least 2.5%, by weight, of an aqueous ethyl alcohol solution comprising 82–92%, by weight, of ethyl alcohol and 18–8%, by weight, of water, with the proviso that the resultant admixture contains at least 0.35%, by weight, of water, whereby said dispersion agglomerates:

(b) reducing the amount of water in the liquid phase of the resultant admixture of agglomerated proteinaceous oat fraction in solvent to less than 0.3%, by weight; and (c) recovering the proteinaceous oat fraction from the admixture.

In a preferred embodiment of the process of the present invention, the dispersion of proteinaceous oat fraction in hydrocarbon solvent contains not more than 12%, by weight, of said fraction.

The present invention also provides a proteinaceous fraction of oats having a bulk density of less than 0.14 g/ml. especially in the range 0.095–0.14 g/ml.

In a preferred embodiment of the proteinaceous oat fraction of the present invention, the fraction has a color brightness of at least 89 units as measured by reflected light, color brightness being defined hereinafter.

In a further embodiment, the proteinaceous oat fraction of the present invention has a dispersibility in orange juice and in water of 0–1 and 0–1.5, respectively, dispersibility being defined hereinafter.

DETAILED DESCRIPTION

In the process of the present invention the proteinaceous oat fraction is dispersed in a hydrocarbon solvent, such solvent being a solvent for any oil in the oats. The solvent facilitates extraction of oat oil from the proteinaceous fraction. The solvent used must be acceptable for use with food stuffs, e.g., be nontoxic at the levels remaining in the products subsequently produced, not cause the formation of toxic materials in the products and not have a significant deleterious effect on the nutritional value of the product. The amount and type of solvent remaining in products offered for sale must be acceptable to the appropriate health authorities, as will be understood by those skilled in the art.

In the process of the present invention the solvents are aliphatic hydrocarbons containing from 5–8 carbon atoms, examples of which are pentane, hexane, heptane and cyclohexane, and mixtures thereof; as used herein the solvents hexane and heptane include those solvents referred to in the food industry as hexane and heptane. For instance, one example of so-called hexane solvent contains 57% n-hexane, 20% methyl pentanes and 13% methyl cyclopentanes. The preferred solvent is hexane. The present invention will generally be described hereinafter with reference to hexane as the solvent.

The process of the present invention is directed to the recovery of a proteinaceous fraction of oats from a dispersion thereof in an aliphatic hydrocarbon solvent, e.g., hexane. The dispersion would normally be such that the proteinaceous fraction could not readily be separated therefrom by centrifugation, filtering or the like. The dispersion may be obtained from a variety of sources involving admixtures of comminuted oats, or fractions thereof, and hydrocarbon solvent, e.g., the processes of R. W. Oughton that are disclosed in the aforementioned U.S. Pat. Nos. 4,211,801 and 4,211,695. In the dispersions of the process of the present invention, the proteinaceous oat fraction has a protein content of at least 50%, by weight, and preferably at least 65%, by weight. Furthermore the dispersion preferably contains not more than 12%, by weight, and especially 2–8%, by weight, of proteinaceous fraction.

The dispersion of proteinaceous oat fraction and hexane is admixed with at least 2.5%, by weight, preferably 5–10%, by weight, of an aqueous ethyl alcohol solution. The ethyl alcohol solution is a solution comprising 82–92%, by weight, of ethyl alcohol and correspondingly, 18–8%, by weight, of water, and in preferred embodiments the solution comprises 83–89%, by weight of ethyl alcohol and correspondingly 17–11%, by weight, of water. Larger amounts of the ethyl alcohol solution may be used but are not preferred because of economic considerations. The resultant admixture of the dispersion and ethyl alcohol solution should be agitated, e.g., by stirring, for a period of time to permit agglomeration of the particles of the proteinaceous oat fraction to occur. The minimum period of time to achieve agglomeration may depend on the amount and nature of the proteinaceous fraction and/or the composition of the aqueous ethyl alcohol solution.

The agglomerated dispersion of proteinaceous oat fraction in the resultant mixed solvent of hexane and aqueous ethyl alcohol is then subjected to steps to reduce the amount of water in the admixture of agglomerated dispersion and solvent to less than 0.3%, by weight, and preferably less than 0.1%, by weight. This may be accomplished in a number of ways. For example, the admixture of agglomerated dispersion and solvent may be subjected to distillation at atmospheric or sub-atmospheric pressure, whereby at least initially an azeotrope of hexane-ethyl alcohol-water may be separated. That azeotrope boils at 52°–59° C. at atmospheric pressure. Alternatively, the admixture may be subjected to a drying agent, e.g., silica gel.

After the water level in the admixture has been reduced to the desired degree, the agglomerated dispersion of proteinaceous oat fraction is recovered by separation from the solvent. Techniques for separation of solids from solvent are known in the art. For example, the solids may be recovered using filtration techniques. Alternatively, the solids may be recovered by centrifuging the admixture. As the solvent may contain dissolved oil, it may be desirable to wash the recovered proteinaceous fraction so as to remove oil adsorbed on the fraction. Any such oil may subsequently be recovered from the solvent.

As is exemplified hereinafter, it is an important embodiment of the present invention that the water content of the admixture of agglomerated dispersion and solvent be reduced to below 0.3%. If the water content is significantly above that amount, the product obtained, e.g., by filtration or centrifugation, is a cake which, upon drying, yields a hard, dense and gritty product. Moreover, the undried cake contains a substantial amount of solvent, e.g., 50–65%, by weight, which adversely affects the amount of additional solvent necessary to obtain a pumpable slurry, the amount of drying required and/or the ease of dispersion of the cake. In contrast, the product obtained using the process of the present invention has a soft texture and a bulk density substantially lower than normal finely ground oat protein and/or flour products. Moreover, pumpable slurries of the product in solvent may be obtained at relatively low liquid contents and the cake is relatively easy to disperse.

The product of the present invention is an oat fraction of high protein content. As such, it may be useful in breakfast cereals, meat products, baby foods, cakes, pastries and cookies, as a nutritional fortifier for wheat flour, beverages and the like.

The product of the present invention viz a proteinaceous oat fraction, may be such a fraction having a bulk density of less than 0.14 g/ml. and especially in the range of 0.095–0.14 g/ml. The measurement of bulk density is known.

In a particular embodiment of the product of the invention, the proteinaceous oat fraction has a color brightness of at least 89 units as measured by reflected light. As used herein, color brightness is defined as the "L" value measured in a Hunterlab ® color difference spectrophotometer. The "L" value is the amount of reflected light and is a measure of the degree of whiteness of the fraction. It varies from a value of 100 for perfect white to zero for black. Thus, the higher the value of the color brightness, the whiter the product. The "a" and "b" values obtained on the Hunterlab ® spectrophotometer are measures of the color of the sample.

In another embodiment of the product of the invention, the proteinaceous oat fraction has a dispersibility in orange juice of 0–1 and a dispersibility in water of 0–1.5. As used herein, dispersibility in orange juice is measured by adding one gram of the proteinaceous oat fraction to 100 ml of canned orange juice, e.g., LIBBY ®'s canned orange juice, in a container, shaking until the fraction has become completely uniformly distributed in the orange juice and measuring the amount of matter, in milliliters, that settles to the bottom of the container in ten minutes. Similarly, dispersibility in water is measured by adding 0.5 g of the proteinaceous oat fraction to a 50 ml Nessler tube (internal diameter approximately 16 mm), adding distilled water to make 50 ml of an admixture, shaking until the fraction has become uniformly distributed in the water and measuring the amount of matter, in millimeters of depth, that settles to the bottom of the tube in ten minutes.

As will be noted from the examples hereinafter, the proteinaceous oat fraction obtained according to the present invention exhibits a lower bulk density and improved color brightness and dispersibility in comparison with oat fractions separated by other techniques. Such properties, separately or in combination, may facilitate the use of proteinaceous oat fractions in a variety of end-uses, for example, those uses noted above.

The present invention is illustrated by the following examples:

EXAMPLE I

A dispersion of oat protein in hexane containing 5.1%, by weight, of solids and 2.2%, by weight, of oat oil, was obtained from a process for the separation of comminuted oats in hexane into fractions differing in composition. The solids contained 79%, by weight, of protein on a moisture-free basis. To 100 g of the dispersion were added 7.5 g of an aqueous ethyl alcohol solution containing 85% ethyl alcohol and 15% water, by weight. The resultant admixture was stirred for about ten minutes and then 60 ml of distillate were removed by distillation, the maximum head temperature in the distillation column being 62° C. The remaining admixture was permitted to cool to ambient temperature (about 25° C.) and then admixed with 60 ml of hexane. The admixture so obtained was centrifuged.

The clear liquid above the centrifuge cake was decanted off. The centrifuge cake was dried under a stream of nitrogen. The dried cake crumbled when touched to give a cream colored powder having a low bulk density.

EXAMPLE II

As a comparison, a procedure obtained in a private communication from J. R. Farnand of the National Research Council, Ottawa was tested. The procedure was that of Example I except that the distillation step was omitted. The dried centrifuge cake that was obtained was discolored and a hard, dense material in comparison to the cream colored product of low bulk density obtained using a process of the invention.

EXAMPLE III

The procedure of Example I was repeated except that the distillation step was replaced by a step in which the admixture was contacted with dried silica gel. The dried centrifuge cake obtained had the same properties as those of Example I.

EXAMPLE IV

A dispersion of protein in hexane was obtained from a process for the separation of comminuted groats (dehulled oats) in hexane into fractions differing in composition. To 2500 g of the dispersion were added 128 g of an aqueous ethyl alcohol solution containing 85% ethyl alcohol and 15% water, by weight. The resultant admixture was shaken for five minutes and then distilled using the procedure of Example I. The remaining admixture was centrifuged and the liquid obtained was decanted off and discarded.

The centrifuge cake obtained was readmixed with hexane, as a slurry, in the proportions 20 g of cake:500 ml of hexane. The cake readily dispersed in the hexane. The admixture was recentrifuged and the liquid layer decanted from the centrifuge cake. The cake was dried under a stream of nitrogen for a period of time and then under vacuum at 80° C.

The above procedure was repeated three times using 2500 g of the dispersion each time. The total amount of solids obtained was 220 g. Analysis showed that the solids contained 85% protein, 3.5% water and 2% oat oil. The solids had a bulk density of 0.13 g/ml.

EXAMPLE V

Samples of oat proteinaceous material were prepared as follows (Samples D, E and F are of the invention and Samples A, B and C are comparative samples):

Sample A: Comminuted oats were admixed with hexane in the form of a slurry and passed through a vibratory screen to remove bran. The slurry passing through the screen was fed to a hydrocyclone. The overflow from the hydrocyclone was a slurry of proteinaceous solids which could not readily be recovered from the slurry by filtration or by use of a centrifuge. The overflow was thereafter admixed with 7.5%, by weight, of a solution of 84.75% ethanol and 15.25% water, by weight, to agglomerate the proteinaceous material, stirred for 15 minutes and centrifuged, at 1700–2000 rpm, in a basket-head centrifuge lined with filter paper. The filter cake obtained was then washed with hexane, readmixed with hexane in the form of a slurry and centrifuged. The solids obtained were dried overnight in a stream of nitrogen. The resulting product was cream colored, slightly gritty when felt and had a protein content of 72.8%, a moisture content of 2.6% and an oil content of 0.2%, by weight.

Sample B: A slurry of proteinaceous solids was obtained using the procedure described for Sample A. The slurry was centrifuged, in a BIRD ® centrifuge using a low feed rate of the slurry to the centrifuge and hence an extended centrifuging time, whereby solid matter was separated from the slurry. The solids, after drying in a vacuum, had a protein content of about 80% and were slightly gritty when felt.

Sample C: A slurry of proteinaceous solids was obtained using the procedure described for Sample A. The overflow was concentrated by ultrafiltration to a solids content of greater than 50%, by weight, and then spray dried. The resulting product had a protein content of about 80%.

Sample D: This sample was the product of Example IV.

Sample E: Flaked oats were admixed with hexane so as not to comminute the oats, separated from the resultant hexane miscella, comminuted using a KADY MILL ® dispersion means and centrifuged. The overflow from the centrifuge contained proteinaceous material that could not readily be separated from the miscella by centrifugation. About 3000 ml of the overflow containing about 3% solids were admixed with 153 g of a solution of 84.75% ethanol and 15.25% water, by weight, to agglomerate the proteinaceous material, shaken manually and allowed to stand for ten minutes. The resultant solution was distilled until the distillate at the head of the distillation apparatus had a temperature of 62° C., cooled and centrifuged for ten minutes. The supernatant liquid was decanted off and the solids obtained were dried overnight under a stream of nitrogen and then under a vacuum (75 mm Hg) at 80° C. for two hours. The resultant solids had a protein content of 70.8%, were white and were soft and fluffy when felt.

Sample F: A slurry of proteinaceous solids was obtained using the procedure described for Sample A. About 3000 ml of the hydrocyclone overflow were admixed with 153 g of a solution of 84.75% ethanol and 15.25%, by weight, to agglomerate the proteinaceous material and then shaken manually for five minutes. The resultant solution was then distilled until the distillate at the head of the distillation apparatus had a temperature of 62° C. and cooled. An amount of hexane equal to that of the distillate was added to the remaining solution and the resultant solution was centrifuged. The solids were dried overnight in a stream of nitrogen and then under vacuum (125 mm Hg) at 50° C. for two hours. The resulting product was white, soft and fluffy when felt and had a protein content of 86% and an oil content of 7.7%, by weight.

Bulk density, dispersibility and color brightness were measured on each of the above samples. The results are shown in Table I.

EXAMPLE VI

To show the effect of the removal of ethanol/water from the agglomerated proteinaceous material, a series of runs were carried out in which varying amounts of ethanol/water were removed. The procedure was as follows:

About 100 g of the protein dispersion of Example IV were admixed with 7.5 g of a solution of 85% ethanol and 15% water, by weight. The resultant solution was shaken mechanically for 15 minutes and then distilled. The temperature of the distillate was noted and the distillate was analyzed using a gas chromatograph. An amount of hexane equal to the distillate was added to the remaining solution which was then centrifuged. The solids obtained were dried and then ground using a mortar and pestle and screened so that each product obtained was of a similar particle size.

The results obtained, which are given in Table II, show that low bulk density material was obtained when the distillate temperature was above 55° C. At that point, more than 85% of the ethanol and an amount of water essentially equal to all of the added water had been removed.

TABLE I

| Sample | Bulk Density (g/ml) | Dispersibility Orange Juice** | Dispersibility Water | Spectrophotometer Readings* L | a | b |
|---|---|---|---|---|---|---|
| A | 0.462 | 4 | 5 | 87.8 | −0.4 | +4.9 |
| B | 0.363 | 2.5 | 4 | 88.8 | −0.4 | +4.9 |
| C | 0.313 | 1 | 3 | 87.3 | −0.8 | +6.6 |
| D | 0.107 | 0.5 | 0.1 | 89.6 | −0.5 | +5.4 |
| E | 0.135 | 1 | 1.5 | 90.8 | −0.4 | +5.0 |
| F | 0.095 | 0 | 0 | 89.1 | −0.7 | +6.1 |

*The "a" value is a measure of green/red in the sample, a negative value indicating a slight green color. The "b" value is a measure of blue/yellow in the sample, a negative value indicating a slight blue color.
**Samples A, B and C tended to be difficult to "wet"; clumps of particles were noted in the solution. Samples D, E and F wetted easily; dispersement tended to be uniform.
N.B. Samples D, E and F are of this invention; Samples A, B and C are comparative examples.

TABLE II

| Run* No. | Distillation Temp. (°) | Distillate Wt (g) | Distillate Composition (g)** Ethanol | Water | Product Bulk Density (g/ml) |
|---|---|---|---|---|---|
| 1 | 54 | 7.0 | 0.9 | 0.2 | 0.486 |
| 2 | 55 | 13.8 | 2.0 | 0.4 | 0.380 |
| 3 | 55 | 20.6 | 2.9 | 0.6 | 0.336 |
| 4 | 55 | 28.7 | 4.2 | 0.8 | 0.256 |
| 5 | 55 | 35.3 | 5.2 | 1.0 | 0.240 |
| 6 | 60 | 38.2 | 5.7 | 1.1 | 0.229 |
| 7 | 65 | 41.8 | 6.6 | 1.1 | 0.220 |
| 8 | 66 | 51.6 | 5.9 | 1.1 | 0.226 |
| 9 | — | — | — | — | 0.437 |
| 10 | — | — | — | — | 0.540 |

*In Run 9, the admixture was refluxed for 30 minutes. No distillate was obtained. In Run 10, the admixture was not heated at all. No distillate was obtained.
**The distillate also contained hexane.

We claim:

1. A process for the recovery of a proteinaceous oat fraction from a dispersion thereof in an aliphatic hydrocarbon solvent, said hydrocarbon having 5–8 carbon atoms and said fraction containing at least 50%, by weight of the fraction, of protein, said process comprising the steps of:
    (a) admixing the dispersion with at least 2.5%, by weight of the dispersion, of an aqueous ethyl alcohol solution comprising 82–92%, by weight of the solution, of ethyl alcohol and 18–8% water, with the proviso that the resultant admixture contains at least 0.35%, by weight of the admixture, of water, so as to agglomerate proteinaceous oat fraction in said dispersion;
    (b) removing water from the liquid phase of the resultant admixture of agglomerated proteinaceous oat fraction in solvent so as to reduce the amount of water to less than 0.3%, by weight of the admixture; and
    (c) recovering such proteinaceous oat fraction by separating the agglomerated fraction from the admixture.

2. The process of claim 1 in which the dispersion contains not more than 12%, by weight of the dispersion, of proteinaceous oat fraction.

3. The process of claim 2 in which the aliphatic hydrocarbon solvent is selected from the group consisting of pentane, hexane, heptane and cyclohexane, and mixtures thereof.

4. The process of claim 2 in which the dispersion contains 2–8%, by weight of the dispersion, of proteinaceous oat fraction.

5. The process of claims 1, 2 or 3 in which, in step (a), the dispersion is admixed with 5–10%, by weight of the dispersion, of the solution of ethyl alcohol and water.

6. The process of claims 1, 2 or 3 in which the aqueous ethyl alcohol solution comprises 83–89%, by weight of the solution, of ethyl alcohol and 17–11%, by weight of the solution, of water.

7. The process of claim 1 in which, in step (b), the amount of water is reduced to less than 0.1%, by weight of the admixture.

8. The process of claim 1 or claim 7 in which the amount of water in the resultant admixture of step (b) is reduced by distillation.

9. The process of claim 1 in which the amount of water in the resultant admixture of step (b) is reduced by contacting the admixture with silica gel.

10. The process of claim 1 in which the proteinaceous fraction in the dispersion contains at least 65%, by weight of the fraction, of protein.

* * * * *